(12) United States Patent
Aaltonen et al.

(10) Patent No.: US 7,606,562 B2
(45) Date of Patent: *Oct. 20, 2009

(54) SYSTEM AND METHOD FOR DETERMINING MOBILE DEVICE CAPABILITIES

(75) Inventors: Janne Aaltonen, Turku (FI); Sami Saru, Turku (FI); Timo Ahopelto, Helsinki (FI); Timo Romppanen, Helsinki (FI)

(73) Assignee: CVON Innovations Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/020,257

(22) Filed: Jan. 25, 2008

(65) Prior Publication Data

US 2008/0305778 A1    Dec. 11, 2008

Related U.S. Application Data

(60) Provisional application No. 60/943,224, filed on Jun. 11, 2007.

(30) Foreign Application Priority Data

Jun. 11, 2007   (GB) ................... 0711255.0

(51) Int. Cl.
*H04W 4/12* (2006.01)
(52) U.S. Cl. .............. 455/414.1; 455/414.2; 455/412.1; 455/466; 455/419; 709/203; 709/219
(58) Field of Classification Search ................ 370/338, 370/331; 455/414.1, 466, 414.2, 412.1, 419; 709/203, 219
See application file for complete search history.

(56) References Cited

U.S. PATENT DOCUMENTS

2002/0083157 A1 * 6/2002 Sekiguchi et al. ........... 709/219

2004/0203851 A1 * 10/2004 Vetro et al. .............. 455/456.1
2006/0129638 A1 * 6/2006 Deakin ....................... 709/203

(Continued)

FOREIGN PATENT DOCUMENTS

EP    1182845 A2    2/2002

(Continued)

OTHER PUBLICATIONS

ETSI TS 100 900 V7.2.0 (Jul. 1999): Digital Cellular Telecommunications System (Phase 2+); Alphabets and language-specific information (GSM 03.38 Version 7.2.0 Release 1998), European Telecommunications Standards Institute 1999.

(Continued)

*Primary Examiner*—Dwayne Bost
*Assistant Examiner*—Pierre-Louis Desir
(74) *Attorney, Agent, or Firm*—Barnes & Thornburg LLP (57) ABSTRACT

Methodologies and system functionality are provided to determine mobile device capabilities and/or configuration setting and user abilities and/or inclinations as a precursor to or as part of the management, delivery and/or assessment of the efficacy of promotional material. The determination of the mobile device capabilities and/or configuration settings and user abilities and/or inclinations may be performed, for example, when provisioning a new service or after such a service has been utilized by a mobile device user. Further, such a determination may be performed in connection with a mobile device service that provides free or subsidized service to mobile device users.

26 Claims, 5 Drawing Sheets

U.S. PATENT DOCUMENTS

2006/0240850 A1* 10/2006 Kaplan .................. 455/466
2007/0066295 A1* 3/2007 Wennberg et al. .......... 455/419
2008/0147592 A1* 6/2008 Nandiwada et al. ........... 707/1

FOREIGN PATENT DOCUMENTS

| EP | 1303107 | 4/2003 |
|---|---|---|
| EP | 1594287 A1 | 11/2005 |
| WO | WO03/058458 | 7/2003 |
| WO | WO 03/073304 A1 | 9/2003 |
| WO | WO 2006/011164 A1 | 2/2006 |
| WO | WO 2007/031708 A1 | 3/2007 |

OTHER PUBLICATIONS

WAG UAProf Version Oct. 20, 2001; Wireless Application Protocol WAP-248-UAPROF-20011020-a, Wireless Application Protocol Forum, Ltd. (2001); http://www.wapforum.org/what/copyright.htm.

UKIPO Search Report dated May 30, 2008 in UK Application No. GB0802175.0.

Extended European Search Report dated Mar. 17, 2008 for EP Application No. 08101544.8.

\* cited by examiner

SYSTEM AND METHOD FOR DETERMINING MOBILE DEVICE CAPABILITIES

This application is a U.S. Patent Application that relies for priority under 35 U.S.C. 120 on Provisional Application Ser. No. 60/943,224 filed on Jun. 11, 2007, which is incorporated herein by reference.

FIELD OF THE INVENTION

The invention relates in general to marketing and advertising campaigns directed to mobile device users. In particular the invention relates to methods, systems and software for determining mobile device capabilities and user abilities thereby improving management, delivery and assessment of the efficacy of marketing and advertising campaign content distribution, as specified in the independent claims.

BACKGROUND OF THE INVENTION

Ensuring that a target audience is being effectively exposed to advertising material is a key issue of any advertising or marketing activity, whether it is in the field of direct marketing or brand advertising. This problem is also suffered by "mobile marketing," which involves and relates to marketing and advertising via mobile devices, e.g., phones, smart phones, and Personal Data Assistants (PDAs), or any other computer device configured to be able to receive or send data wirelessly, receiving promotional material, i.e., marketing and/or advertising content in the form of, e.g., text, audio, video or some combination thereof associated with a particular product, service or combination thereof.

Mobile marketing enables advertisers to directly reach individual consumers in a targeted way. This is because the nature of mobile media is personal, in that mobile devices are generally used by a particular individual rather than a group of individuals. Further, mobile media is, by definition, mobile, which offers a transportable mechanism for exposing potential consumers to promotional material. Moreover, because mobile media is "always on," advertisers are not constrained by the need to make a connection in order to deliver promotional material to a user's device because a connection is always established with a user's mobile device (provided the mobile device is in range of an available communication network). As an additional benefit of mobile media as an advertising mechanism, mobile media enables groups of individuals to form wherein the group members communicate actively with each other. As a result, these characteristics combined with social networks-based marketing approach of the Internet may form a very powerful base to execute marketing strategies.

However, there is a cost associated with this targeted distribution of promotional material. Typically the cost is associated with delivery of a direct advertisement message to a targeted individual (i.e., someone who has the attributes identified in an advertising campaign) by direct marketing, or media space in brand advertising. Therefore, an advertiser will attempt to ensure that promotional material is distributed effectively to ensure that the targeted individual is exposed to the promotional material.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with at least one embodiment of the invention, determination of mobile device capabilities and user abilities are performed as a precursor to or as part of the management, delivery and/or assessment of the efficacy of promotional material, as specified in the independent claims. This is achieved by a combination of features recited in each independent claim. Accordingly, dependent claims prescribe further detailed implementations of the present invention.

BRIEF DESCRIPTION OF THE DRAWINGS

A more compete understanding of the present invention and the utility thereof may be acquired by referring to the following description in consideration of the accompanying drawings, in which like reference numbers indicate like features, and wherein.

DETAILED DESCRIPTION OF THE INVENTION

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

In general, mobile marketing and advertising activities can be divided into four categories: mobile Customer Relation Management (CRM), mobile marketing, mobile advertising, and mobile direct advertising. Mobile CRM involves a combination mobile advertising, mobile marketing and mobile direct marking (each explained herein) in a manner that establishes a long-term, engaging relationship between the customer and the promoting company.

Mobile marketing involves the systematic planning, implementation and control of a mix of business activities intended to bring together buyers and sellers for the mutually advantageous exchange or transfer of products or services where the primary point of contact with the potential consumer is via their mobile device. To the contrary, mobile advertising may be thought of more narrowly as the paid, public, non-personal announcement of a persuasive message by an identified sponsor (i.e., an advertiser), the non-personal presentation or promotion by a firm of its products to its existing and potential customers where such communication is delivered to a mobile phone or other mobile device. Examples of mobile advertising would include: Wireless Application Protocol (WAP) and Web banner advertisements, mobile search advertising, mobile video bumpers, and interstitial advertisements.

Mobile direct marketing differs from mobile marketing typically in that direct marketing involves promotional material being delivered to a mobile device on an individual basis. Accordingly, examples of mobile direct marketing include the sending of Short Messaging Service (SMS), Multimedia Messaging Service (MMS) or WAP push messages, Bluetooth messaging and other interrupt-based marketing to mobile devices. Such direct marketing often uses text and picture messaging. MMS, also known as picture messaging, is a widely used service with mobile phone users. Picture messaging refers to the sending of an image, e.g., a photograph produced by a mobile phone, to another mobile phone or to a server or electronic-mail account. Conventionally, the images are sent in some predetermined picture format, e.g., Joint Picture Expert Group (JPEG). In addition to pictures MMS messages might compose of video, audio, hypertext etc.

Direct marketing, be it mobile, Internet-based or conventional, generally utilizes consumer profile information to ensure that promotional material is designed to be effective with a particular type of consumer and is sent to that type of consumer. Accordingly, as a marketing or advertising campaign is formulated, an advertiser will identify what particular technological capabilities the target audience will have, e.g., mobile phone having MMS capability, a mobile phone user with some degree of proficiency with MMS, etc.

One challenge faced by mobile marketing and advertising campaigns is implementing conventional marketing and advertising principals in the technologically unique advertising channel of mobile media. Mobile devices' capabilities to receive and present various types of content, e.g., MMS messages, vary from device to device, model to model and brand to brand due to different technical capabilities, memory and software and firmware configurations. In addition, the abilities of consumers to use mobile device functionality and consumers' interest in using mobile device functionality vary.

These variations lead to problems of determining what type of promotional material should be sent to a target audience and in what format, e.g., MMS messages, WAP Push data, etc. For example, MMS-enabled mobile devices enable subscribers to compose and send messages with one or more multimedia parts. Multimedia is media or content that uses multiple forms of information content and information processing (e.g. text, audio, graphics, animation, video, interactivity, hypermedia, etc.) to inform, entertain or persuade a user. The term "rich media" is synonymous with multimedia and, therefore, refers to data that can be represented through audio, graphics, image, video and animation in addition to what may considered to be more traditional media (e.g., text and graphics).

MMS-enabled mobile devices enable subscribers to compose and send messages with one or more multimedia parts. Multimedia is media that uses multiple forms of information content and information processing (e.g. text, audio, graphics, animation, video, interactivity) to inform, entertain or persuade a user audience. The term "rich media" is synonymous with multimedia.

Multimedia means that computer info can be represented through audio, graphics, image, video and animation in addition to traditional media (text and graphics). Hypermedia can be considered one particular multimedia application. Mobile devices with built-in or attached cameras, or with built-in MP3 players are very likely to also have a MMS Messaging Client (MMSC), which is a software program that interacts with the mobile device user to compose, address, send, receive, and view MMS messages.

However, it should be understood that one problem faced by advertisers in mobile marketing is that multimedia content created for one type or brand of mobile device may not be entirely compatible with the capabilities of a user's mobile device. In MMS architecture, for example, generally the recipient MMSC is responsible for providing for content adaptation functionality, e.g., image resizing, audio codec transcoding, etc., if this feature is enabled by a mobile network operator. When content adaptation is supported by the network operator, its MMS subscribers enjoy compatibility with a larger network of MMS users than would otherwise be available.

Although conventional MMS specifications do not include distribution lists or methods by which large numbers of recipients can be conveniently addressed in 3GPP, large distribution lists may be transferred to the MMSC using File Transfer Protocol (FTP). However, if a user's mobile device receives content including an MPEG-4 video in Audio Video Interleave (AVI) format, but the user's mobile device does not support that format, then the content is of no value to the user.

Further, if that content is sent by an advertiser or marketing organization, the promotional material included in the content is ineffective because it cannot be output to the user. As a result, advertising and marketing to mobile device users is more effective if it can be determined what the user's mobile device capabilities are and/or the user's ability to use those capabilities. For example, to ensure a high quality experience for a mobile device user and ensure that promotional material is output the user for maximum impact, it is useful to ensure that mobile device capabilities are known and configuration settings are set appropriately. Thus, a determination may be made regarding the output capabilities of the mobile device, e.g., a display type of a mobile phone. For example, there is value in determining whether a mobile device display is a color display, the size of the display, the resolution of the display, the number of colors supported in the display, the number of pixels included in the display, etc. Differences in one or more of the those display features can lead to situations in which a received image is not "readable" by a user on the mobile device, colors may be different than in the original image, and/or the overall user experience of an advertisement may be poor due to such difficulties. Such deficiencies may occur even when various conventional settings optimization or intelligent adaptation technologies are used on the mobile device (e.g., intelligently recognizing that data has a particular format and must be output accordingly) or provided with the promotional material.

From an advertiser's point of view, these types of deficiencies are particularly problematic because such poor user experiences may result in negative feelings beings associated with an advertised product/service. In addition there might be several different formats of the pictures such as GIF, animated GIFS, JPEG, PGP etc to mention few. Some of the terminal might show the different formats in different ways.

Conventionally, there are commercial solutions, which can be used to classify phone models based on their International Mobile Equipment Identity (IMEI) code (see, for example, ETSI TS 100 508 V7.2.0 (2000-07). In accordance with these solutions, a network operator or third party maintains a list of mobile devices that have the capability to support use of a particular service, e.g., MMS. As a result, the network operator or a third party may maintain intermediate server systems that perform MMS content adaptation processes in order to modify content to be appropriate for a particular subset of mobile devices. For example, if mobile devices used by a subset of a target audience lack the capability to receive MMS content, an advertiser may be able to send promotional material to that subset of mobile devices via an intermediate server that removes the MMS content or translates the content into SMS or Enhanced Messaging Service (EMS).

Such solutions may utilize Wireless Application Protocol specification WAP-248-UAPROF-20011020, sometimes known as "The User Agent Profile" specification. This specification provides a paradigm for capturing classes of device capabilities and preference information. These classes include (but are not restricted to) the hardware and software characteristics of the mobile device as well as information about the network to which the mobile device is connected. Thus, the User Agent Profile may contain information that may be used for content formatting purposes.

However, access to a User Agent Profile may be controlled by a network operator rather than an advertiser or advertising firm. As a result, advertisers and advertising firms may be prohibited from using the information included in the User Agent Profile except at the discretion of the network operator.

Accordingly, functionality and method operations that provide information regarding mobile device capabilities, mobile device user abilities, preferences and settings may be of particular to utility to advertisers, advertising firms, and other interested parties to ensure that delivered promotional material is appropriate.

Additionally, even if a mobile device may, in theory, be capable of providing functionality that supports output of particular promotional material, e.g., color, etc., the mobile device may not be working correctly, e.g. display is partly broken, or configured appropriately. Further, merely knowing that a mobile device has functionality based on its model number does not provide a solution to situations where the mobile device user may not be capable of fully appreciating output promotional material, for example, the mobile device user may be color blind, e.g. red-green, and therefore user may have difficulties to see advertisements properly or hearing impaired with difficulties of listening audio advertisements. Similarly, the user may simply lack the ability to effectively use certain functionality of their mobile device or properly set configuration settings to effectively view advertisements effectively.

Additionally the mobile device could output advertisements or messages in audio and/or video format. Capability of mobile device to output different video frame rates, resolutions and capability to output audio as mono, stereo or high fidelity (HiFi) may affect efficiency of advertisement campaign. There might in addition to be several different content formats for video and audio such and Microsoft MediaPlayer format and Real networks real format or iTunes audio format and MP3 format to mention few.

A further problem for content providers and advertisers targeting mobile device users is that few mobile network operators offer content providers or advertisers direct connectivity to the network operators' MMSCs. As a result, many content providers and advertisers have conventionally used WAP push as the only method available to deliver rich content to mobile devices. WAP push enables rich content to be delivered to a handset by specifying the Universal Resource Location (URL) (via binary SMS) of a pre-compiled MMS hosted on a content provider's web server. However, a downside of WAP push is that from a billing perspective this content is typically billed at data rates rather than as an MMS. These charges can be significant and result in consumers being charged at rates that they were not expecting.

Thus, in accordance with at least one embodiment of the invention, methodologies and components may be provided to enable a determination of whether a mobile device can receive and output MMS messages, WAP push messages or both. However, it should be appreciated that at least one embodiment of the invention may be used to determine a mobile device capability and/or mobile device user's ability to use not only MMS, but also or alternatively Enhanced Messaging Service (EMS), WAP Push, or other mechanisms and methodologies for delivering rich content including, e.g., content download, content downloads using Internet protocol, scheduled content download, special text formatting (such as bold or color), animations, pictures, icons, sound effects, and special ring tones, to user audience mobile devices. As should be understood from the provided description of various invention embodiments, at least one embodiment of the invention enables determination of mobile device capabilities and user abilities and inclinations as a precursor to, or as part of the management, delivery and/or assessment of the efficacy of promotional material.

Figure 1:
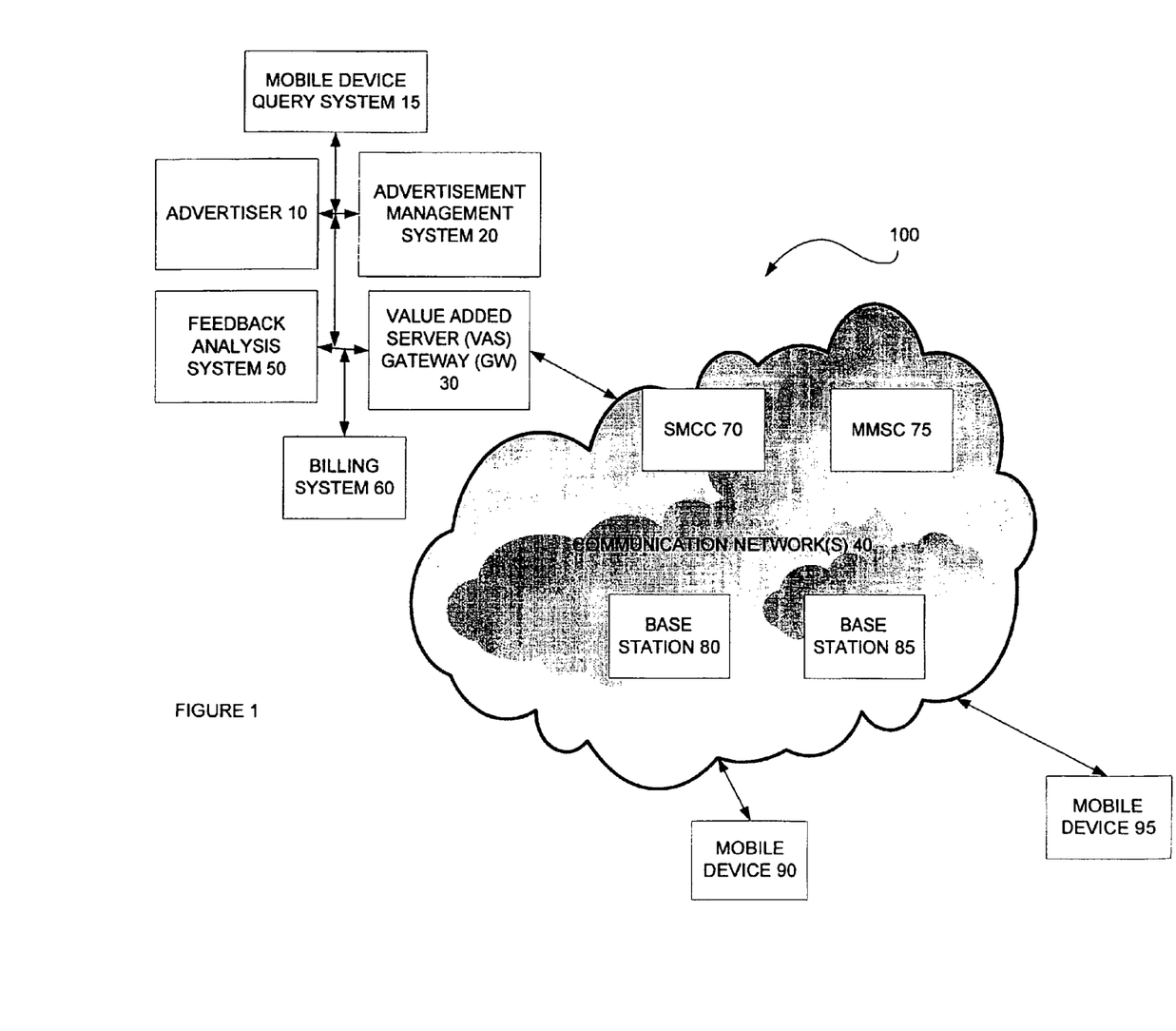
FIG. 1 illustrates an advertising environment wherein embodiments of the invention may be utilized.

With this understanding of the utility of embodiments of the invention in mind, a description of the architecture and operation of various invention embodiments is now provided. FIG. 1 illustrates an advertising environment wherein embodiments of the invention may be utilized. Embodiments of the invention may be utilized in environment 100 to provide improved mobile marketing and/or advertising campaign efficacy. For example, the advertising environment 100 may include one or more networks enabling free or subsidized phone services in exchange for subscribers viewing a number of targeted advertisements that are relevant to the subscriber.

As illustrated in FIG. 1, an advertiser 10 (which may be an advertiser, advertising firm, media agency, operator, consultancy company or other similar entity interested in implementing, managing or determining the efficacy of a marketing or advertising campaign) may access the advertisement management system 20 (illustrated in further detail in FIG. 2) in order to manage and control distribution of promotional material in connection with one or more marketing or advertising campaigns.

The advertiser 10 may reserve, program, and/or book an advertisement campaign via a user interface (explained further with reference to FIG. 2 and implemented as, for example, a web interface) for advertisement management system 20. As part of that advertising campaign, promotional material is distributed to a plurality of mobile devices for output to the mobile device users. The promotional material for the campaign may include information in form of data, text, pictures, audio, video, HyperText Markup Language (HTML), eXtensible Markup Language (XML), eXensible HyperText Markup Language (XHTML) to advertisement management system 20. The advertiser 10 may also indicate instructions for the timing of sending promotional material, details regarding which users should receive the promotional material (e.g., characteristics of mobile device users included in a target group or groups for the advertising campaign), in which format (e.g., SMS, MMS, WAP Push, Web pages, digital object, etc.), a target price level for the advertising campaign, a target feedback level, demographics of the target audience, duration of the advertisement campaign, etc.

The advertisement management system 20 can be operationally coupled to the Value Added Service (VAS) GateWay (GW) 30, which can be used to execute the campaign and deliver information about the campaign back to the advertisement management system 20. As such, the VAS GW 30 may be implemented in whole or in part using one or more intermediate servers between the advertisement management system 20 or with the system 20 and the one or more communication networks 40. Alternatively, the VAS GW 30 may be implemented in combination with the advertisement management system 20.

The mobile device query system 15 may be configured to receive information for use in formulating one or more mobile device queries, which, when responded to by a mobile device user, would provide an indication of the functionality of the user's mobile device. For instance, if promotional material content is to be delivered to mobile device users via MMS, the mobile device query system 15 may be configured to work in combination with VAS GW 30 to send one or more queries to mobile devices, e.g., mobile devices 90, 95, to determine whether those devices have the capability to receive and output messages using MMS. This may be done by sending one or more mobile devices a query via MMS. If the mobile devices have the capability, then a user of the device may respond to the query, thereby confirming MMS service functionality for the user's mobile device. Further, receipt of a response to such a query indicates that the user has (1) the ability to understand the output MMS message query and respond to that query; and (2) is inclined to respond to such a query (assuming that a response to a query is an indication that the user will respond to future queries).

Thus, the mobile device query system 15 is also operationally coupled to the VAS GW 30, and can be used to formulate and direct delivery of one or mobile device queries to mobile device users via the VAS GW 30. Likewise, the VAS GW 30 may be implemented in whole or in part using one or more intermediate servers between the mobile device query system 15, and or the advertisement management system 20 or with the system 20 and the one or more communication networks 40. Alternatively, the mobile device query system 15 may be implemented in combination with the VAS GW 30 and/or the advertisement management system 20.

Figure 2:
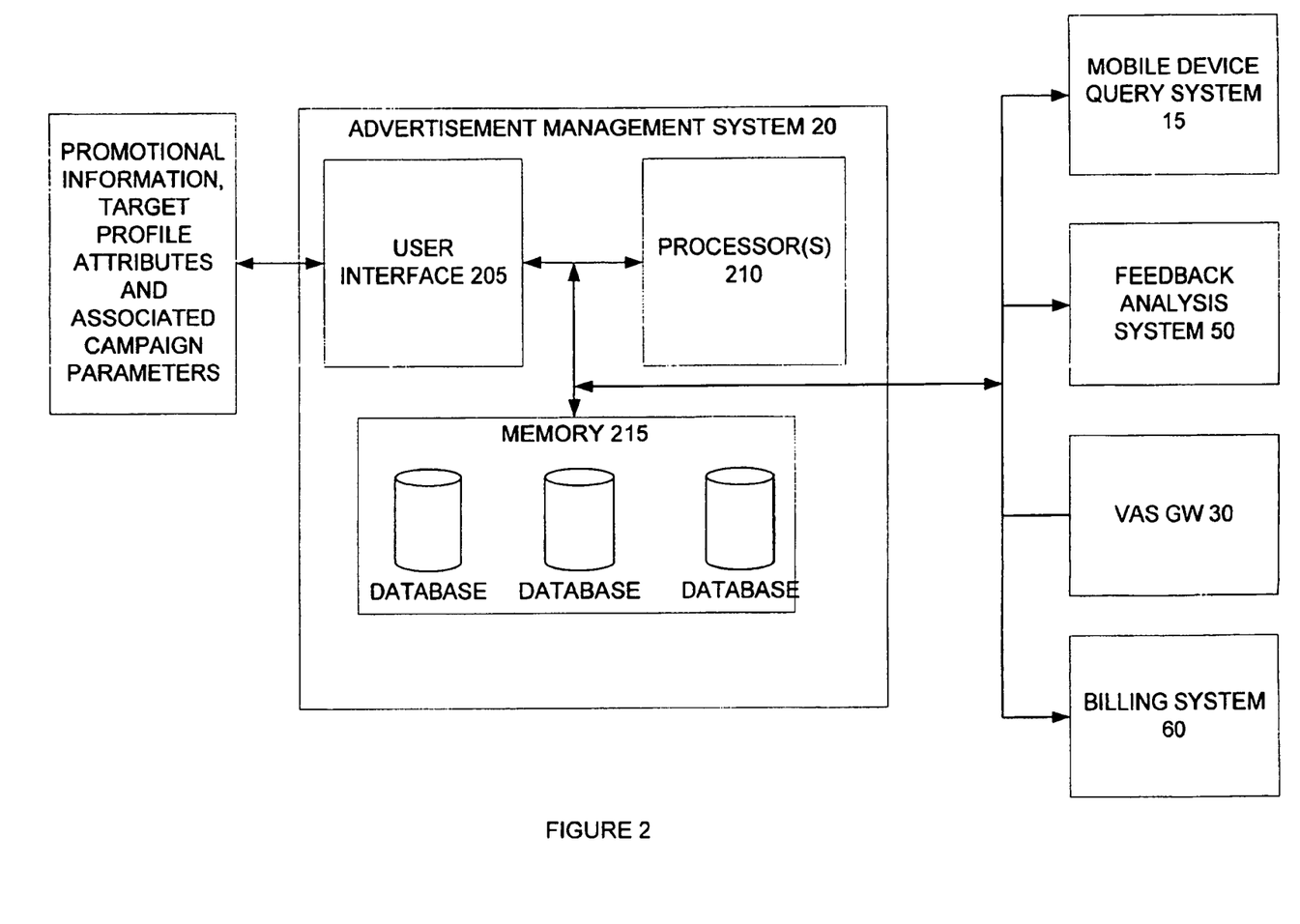
FIG. 2 illustrates additional details included in an advertisement management system provided in accordance with at least one embodiment of the invention.
Figure 3:
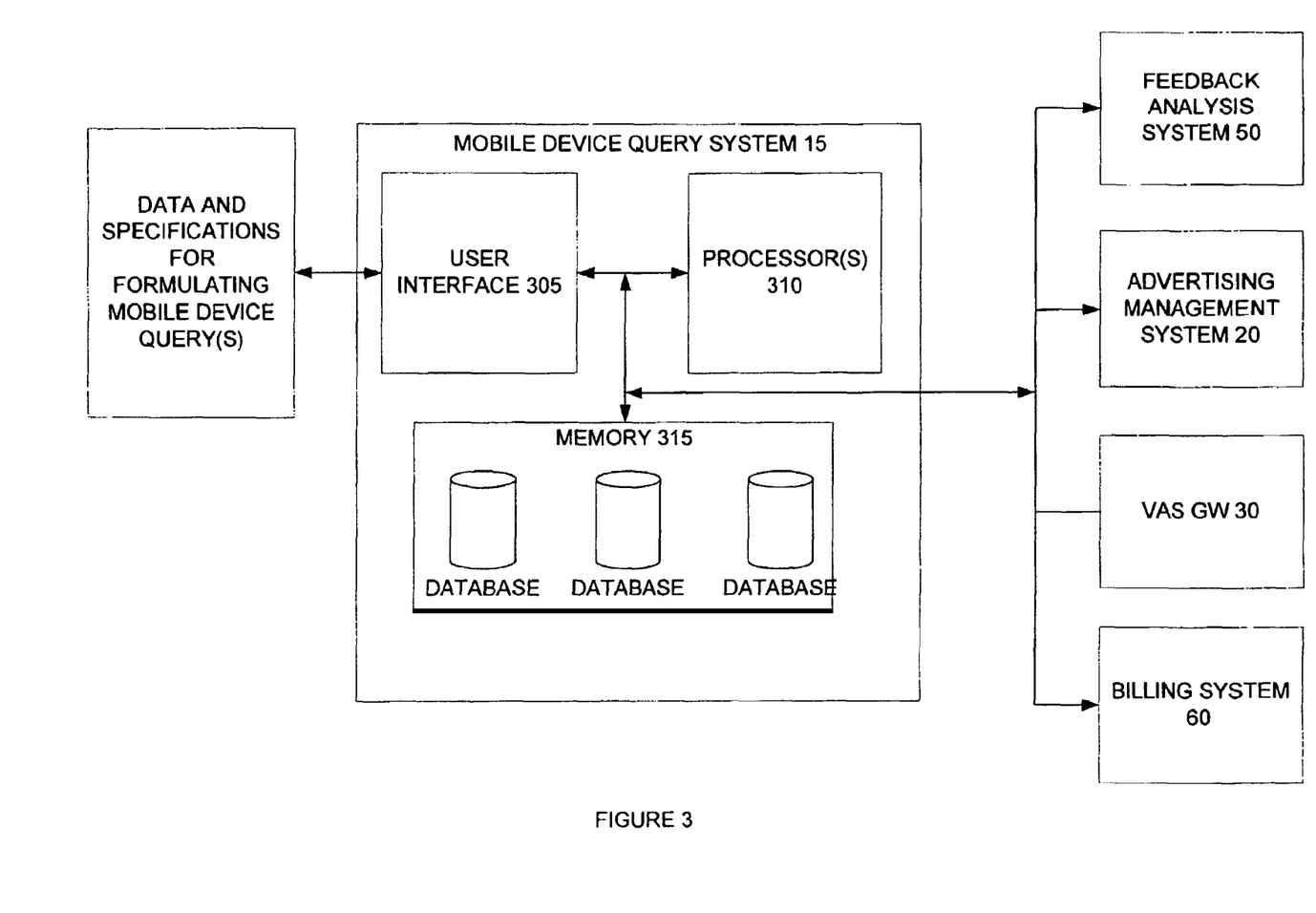
FIG. 3 illustrates further details included in a mobile device query system provided in accordance with at least one embodiment of the invention.
Figure 4:
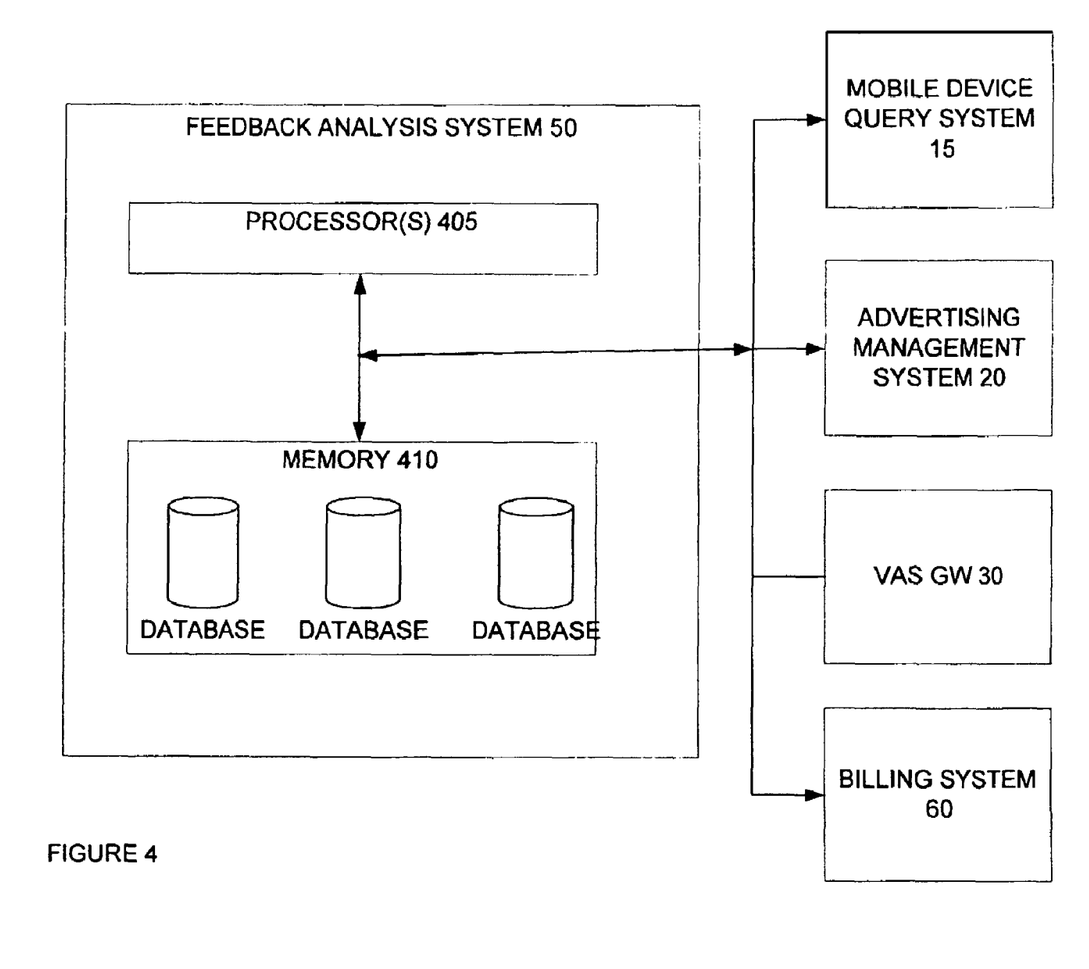
FIG. 4 illustrates further details included in an efficacy feedback determination mechanism provided in accordance with at least one embodiment of the invention.

If the functionality of any of the mobile device query system 15, advertisement management system 20 or the VAS GW 30 are implemented in combination (in whole or in part), it should be understood that the constituent components of each of these systems illustrated in FIGS. 2-4 may be combined to some extent.

The one or more communication networks 40 may include any type of communications network including but not limited to a second Generation (2G) network, a 2.5 Generation network, a third Generation (3G) network utilizing Global System for Mobile Communications (GSM), Wideband Code Division Multiplex Access (WCDMA), Code Division Multiplex Access (CDMA), or Time Division Multiplex Access (TDMA), General Packet Radio Services (GPRS), Universal Mobile Telephone System (UMTS). Further, the one or more communication networks 40 may also include local area networks, such as Wireless Local Area Networks (WLAN), BlueTooth (BT) and optionally utilize one or more other technologies, such as WiMax (WorldwideInteroperability for Microwave Access). Communication via the one or more communication networks 40 may be implemented by broadcasting over cellular, broadcasting over DVB-H (Digital Video Broadcasting-Handhelds), ISDB-T (Terrestrial Integrated Services Digital Broadcasting) or DMB (Digital Multimedia Broadcasting). Further, optionally, MediaFlo™ may be used to provide a connection and to deliver a service.

The one or more communication networks 40 can also include any other type of network of interconnected devices or device networks, e.g., interconnected computers or computer networks. Accordingly, it should be understood that the one or more communication networks 40 can also be a combination of a plurality of different types of networks forming one or more hybrid networks.

The one or more communication networks 40 may include one or more Short Message Service Centers (SMSC) 70 and/or Multimedia Message Service Centers 75 and/or include the functionality thereof in either a centralized or distributed manner. Accordingly, the one or more communication networks 40 may enable transmission of SMS and MMS messages.

The one or more communication networks 40 may further include one or more base stations 80, 85 wireless communications station installed at fixed locations and used to communicate as part of either a push-to-talk two-way radio system or a wireless telephone system, for example, cellular, CDMA or GSM.

A feedback analysis system 50 may be configured to perform analysis of responses to one or more mobile device capability queries as well as, or alternatively, promotional material response rates of users. Further, the feedback analysis system 50 may be configured to generate one or more types of correlations between mobile device capability query responses and users' mobile device capabilities and/or settings and/or user abilities and/or preferences. Optionally, the feedback analysis system 50 may be configured to provide data resulting from those correlations or utilized by those correlations in mobile device User Agent Profiles.

Further, the feedback analysis system 50 may be coupled to the VAS GW 20 to communicate feedback analysis data such as user device capability and user ability query responses and correlation data with the advertisement management system 20 for use by the advertiser 10, a network operator or other third party. However, it should be understood that, although not shown, the feedback analysis system 50 may be directly connected to the advertisement management system 20 or the advertiser 10 via one or more communication networks, which optionally, may include communication network(s) 40.

The one or more communication networks 40 may also provide operational coupling between a billing system 60 and the VAS GW 20 or directly with the advertisement management system 20. It should be understood that the billing system 60 may also be configured to receive information from the feedback analysis system 50 and to determine cost of distribution of promotional material based on that received information. Once an advertiser has provided data indicating how promotional material is to be distributed (e.g., the content and format of the promotional material) in connection with a marketing and/or advertising campaign, the information may be used to deliver the promotional material via the one or more communication networks 40 to one or more mobile devices 90, 95 (as explained in greater detail in connection with FIG. 2).

Each of the mobile devices 90, 95 can be implemented as a mobile phone, lap top, PDA, multimedia computer, smart phone, etc. Accordingly, although not illustrated, it should be understood that a mobile device 90, 95 may include a processor connected to a user interface, computer readable memory and/or other data storage and a display and/or other output device. The mobile device may also include a battery, speaker and at least one antenna. The user interface may further include a keypad, touch screen, voice interface, one or more arrow keys, joy-stick, data glove, mouse, roller ball, touch screen or the like.

Accordingly, computer executable instructions and data used by a processor included in a mobile device 90, 95 and other components within the mobile device may be stored in the computer readable memory included the mobile device. Further, the memory may be implemented with any combination of read only memory modules or random access memory modules, optionally including both volatile and non-volatile memory. Further, software may be stored within the memory and/or storage to provide instructions to the mobile device's processor for enabling the mobile device to perform various functions. Alternatively, some or all of the mobile device computer executable instructions may be embodied in hardware or firmware (not illustrated).

As illustrated in FIG. 2, the advertisement management system 20 may include one or more processors 205 operationally coupled to a user interface 210, computer readable memory and/or other data storage 215. Accordingly, computer executable instructions and data used by the processor(s) 205 and other components within the advertisement management system 20 may be stored in the computer readable memory included the advertisement management system 20. Further, software may be stored within the memory and/or storage 215 (coupled to the processor(s) 205 and user interface 210) to provide instructions to the advertising management system components for enabling the system 20 to perform various functions.

For example, the advertising management system 20 may be configured to receive promotional material and/or information indicating the content of the promotional material (e.g., audio, video, text, graphics, font type, font color, etc.) and format of the promotional material (e.g., MMS, EMS, SMS, WAP push, etc.) associated with marketing and/or advertising campaigns as well as other details regarding distribution of such promotional material via the user interface 210. Subsequently that information may be stored in one or more databases included in the computer readable memory and/or other data storage 215. Accordingly, the user interface 210 may be configured to enable an advertiser 10 or other entity to interact with components of the advertisement management system 20 as well as other systems coupled to the system 20 such as VAS GW 30, feedback analysis system 50 and billing system 60 to manage and control distribution of promotional material and analysis of responses thereto as part of one or more marketing or advertising campaigns.

Accordingly, the user interface 210 may be implemented as a web-based user interface provided by software stored in the memory 215 or running on one or more servers associated with or supporting the advertisement management system 20. The memory 215 may include one or more databases configured to store individual-specific profile information, e.g., in association with, including or included in User Agent Profiles, indicating one or more attributes of individuals to optionally receive promotional material. As an example of such profile information can indicate what formats (e.g., SMS, MMS, WAP Push, Web pages, digital object, etc.) of promotional material a user's mobile device is capable of receiving and outputting, historical data indicating the format, content and/or timing of queries to which the user has responded, user profile demographics (e.g., an individual's age, gender, zip code, food preferences, music preferences, movie preferences, etc.) Additionally, memory 215 may include additional databases for storing promotional material archive information, which may indicate what promotional material has been sent to specific individuals in the past, the type of promotional material (e.g., SMS, couponing, text-to-win campaign material) and the individuals' responses to the promotional material. Additionally, the memory 215 may also include one or more databases for storing actual promotional material and related distribution parameters for use in distributing the promotional material in connection with campaigns.

It should be understood that memory 215 may include many databases that separately include, for example, profile attribute information, promotional material, archive data, etc. or some combination or all of this information and data may be included in a single database.

As illustrated in FIG. 3, the mobile device query system 15 may include one or more processors 305 operationally coupled to a user interface 310, computer readable memory and/or other data storage 315. Accordingly, computer executable instructions and data used by the processor(s) 305 and other components within the mobile device query system 15 may be stored in the computer readable memory included the mobile device query system 15. Further, software may be stored within the memory and/or storage 315 (coupled to the processor(s) 305 and user interface 310) to provide instructions to the mobile device query system components for enabling the system 20 to perform various functions.

For example, the mobile device query system 15 may be configured to receive information including data and specifications for formulating one or more mobile device queries and indicating the content and/or nature of mobile device queries including whether queries are directed to determining mobile device capabilities and user abilities regarding, e.g., audio, video, text, graphics, font type, font color, available memory, resolution, video play back capabilities, number of colours, screen size, audio capabilities etc. and format capabilities, e.g., MMS, EMS, SMS, WAP push, etc. via the user interface 310.

Subsequently that information may be stored in one or more databases included in the computer readable memory and/or other data storage 315. Accordingly, the user interface 310 may be configured to enable an advertiser 10 or other entity to interact with components of the mobile device query system 15 as well as other systems coupled to the system 15 such as the advertising management system 20, VAS GW 30, feedback analysis system 50 and billing system 60.

Accordingly, the user interface 310 may be implemented as a web-based user interface provided by software stored in the memory 315 or running on one or more servers associated with or supporting the mobile device query system 20. Thus, the mobile device query system 15 may be configured to receive information for use in formulating one or more mobile device queries, which, when responded to by a mobile device user, would provide an indication of the functionality of the user's mobile device. For instance, if promotional material content is to be delivered to mobile device users via MMS, the mobile device query system 15 may be configured to work in combination with VAS GW 30 (or other equipment or components) to send one or more queries to mobile devices, e.g., mobile devices 90, 95, to determine whether those devices have the capability to receive and output messages using, e.g., MMS; this may be done by sending one or more mobile devices a query via MMS. If the mobile devices have the capability, then a user of the device may respond to the query, thereby confirming MMS service functionality for the user's mobile device.

Further, receipt of a response to such a query may be presumed to indicate that the user has (1) the ability to understand the output MMS message query and respond to that query; and (2) is inclined to respond to such a query (assuming that a response to a query is an indication that the user will respond to future queries).

The memory 215 may include one or more databases configured to store individual-specific profile information, e.g.

User Agent Profiles, indicating one or more attributes of individuals to optionally receive promotional material. As an example of such profile information can indicate what formats (e.g., SMS, MMS, WAP Push, Web pages, digital object, etc.) of promotional material a user's mobile device is capable of receiving and outputting, historical data indicating the format, content and/or timing of queries to which the user has responded, user profile demographics (e.g., an individual's age, gender, zip code, food preferences, music preferences, movie preferences, etc.)

Additionally, memory 215 may include additional databases for storing promotional material archive information, which may indicate what promotional material has been sent to specific individuals in the past, the type of promotional material (e.g., SMS, couponing, text-to-win campaign material) and the individuals' responses to the promotional material. Additionally, the memory 215 may also include one or more databases for storing actual promotional material and related distribution parameters for use in distributing the promotional material in connection with campaigns.

It should be understood that memory 215 may include many databases that separately include, for example, profile attribute information, promotional material, archive data, etc. or some combination or all of this information and data may be included in a single database.

As illustrated in FIG. 4, the feedback analysis system 50 may include one or more processors 405 and computer readable memory and/or other data storage 410. Accordingly, computer executable instructions and data used by the processor 405 and other components within the feedback analysis system 50 may be stored in the computer readable memory 410 included the feedback analysis system 50. Further, software may be stored within the memory and/or storage 410 to provide instructions to the feedback analysis system components for enabling the system 50 to perform various functions.

For example, the feedback analysis system 50 may receive data indicating specific information regarding mobile device capability query responses and promotional material responses for mobile device users. Further, the feedback analysis system 50 may be configured to analyze those response data and determine correlations with profile attributes of the mobile device user. As a result, the feedback analysis system 50 may be configured to access data stored in the memory 415 of the advertisement management system 20.

Subsequent to the analysis of the feedback analysis system 50, the generated results may be transmitted back to the advertisement managements system 20 for review by the advertiser in whole or in part. Additionally, the billing system 60 may have access to the feedback analysis system's generated data to prepare one or more billing statements indicating a cost of the distribution of the promotional material, and, optionally, alternative costs associated with targeting other profile attributes (e.g., those identified as effective at achieving high response rates).

As a result, the feedback analysis system 50 may also be configured to generate data from the comparison of response rates for the mobile device capability queries for one or more promotional material formats so as to provide advertisers with information indicating which formats are most effective at eliciting responses. For example, by sending one or more mobile device queries to determine whether users are able to respond to promotional material in a particular format, the advertising management system (in combination with the feedback analysis system 50 and VAS GW 30) enables advertisers to better understand which format is most effective for communicating their promotional material. By providing this understanding without requiring the advertiser to pay for distributing their own promotional material, the advertiser is provided with a value added service wherein the advertiser can effectively identify which format is most effective and/or appropriate for the promotional material for their advertising campaign(s).

Although not explained in detail above, it should be understood that the mobile device query system 15, advertisement management system 20, the VAS GW 30, feedback analysis system 50 and billing system may each or all be implemented using one or more servers including software to coordinate, implement, analyze and report on the delivery of mobile device capability queries and of promotional material to targeted individuals based on parameters such as promotional material content type, delivery time, method, target consumers, target profiles, etc. Thus, in accordance with at least one embodiment of the invention, the advertiser may receive information regarding the delivery and response rate associated with promotional material distributed in particular formats, e.g., an MMS message; such information may include a delivery report and read-reply report for each recipient of the distributed promotional material.

In accordance with at least one embodiment of the invention, a methodology and components are provided that facilitate or aid in the facilitation of setting mobile device parameters for receipt of content in one or more formats. Incorrect mobile device parameters can result in the inability to receive and output particular formats of content, e.g., MMS. Moreover, mobile device parameters may be set such that the mobile device is configured to receive and output MMS content, but with poor quality.

Nevertheless, service settings are sometimes preconfigured on mobile devices. Thus, in accordance with at least one embodiment of the invention, the invention may be used to analyze present mobile device settings and provide customized setting adjustments for improving MMS content receipt and output. This may be performed by sending one or more mobile device capability queries to a mobile device user, wherein each of the queries elicits a response that indicates information about the settings of the mobile device. Subsequently, responses to the queries may be analyzed to determine whether the settings are optimized for receipt and output of particular formats of promotional material content, e.g., MMS. This analysis may then be used to provide instruction to the mobile device user for reconfiguring the settings of the mobile device to improve receipt and/or output performance.

Alternatively, reconfiguration of the settings may be performed automatically or at the mobile device user's discretion via Over-The-Air programming (OTA). OTA, also known as Over-The-Air Service Provisioning (OTASP), Over-The-Air Provisioning (OTAP) or Over-The-Air Parameter Administration (OTAPA), is a method of distributing new software updates to mobile devices or provisioning mobile devices with the necessary settings with which to access services such as WAP or MMS. The OTA mechanism requires the existing software and hardware of the target device to support the feature, namely the receipt and installation of new software received via the wireless network from the provider.

To provision parameters in a mobile device OTA, the device needs to have a provisioning client capable of receiving, processing and setting the parameters. For example, a device management client in a device may be capable of receiving and provisioning applications, or connectivity parameters.

In general, the term OTA implies the use of wireless mechanisms to send provisioning data or update packages for firmware or software updates to a mobile device—this is so that the user does not have to go to a store or a service centre to have applications provisioned, parameters changed or firmware or software updated.

Further, in accordance with at least one embodiment of the invention, it may be determined whether a user's device supports immediate and/or deferred MMS delivery. Immediate or deferred delivery are mobile device dependent modes, which means that the mobile device manufacturer can provide the mobile device in one mode or the other or let the user decide his/her preference.

Figure 5:
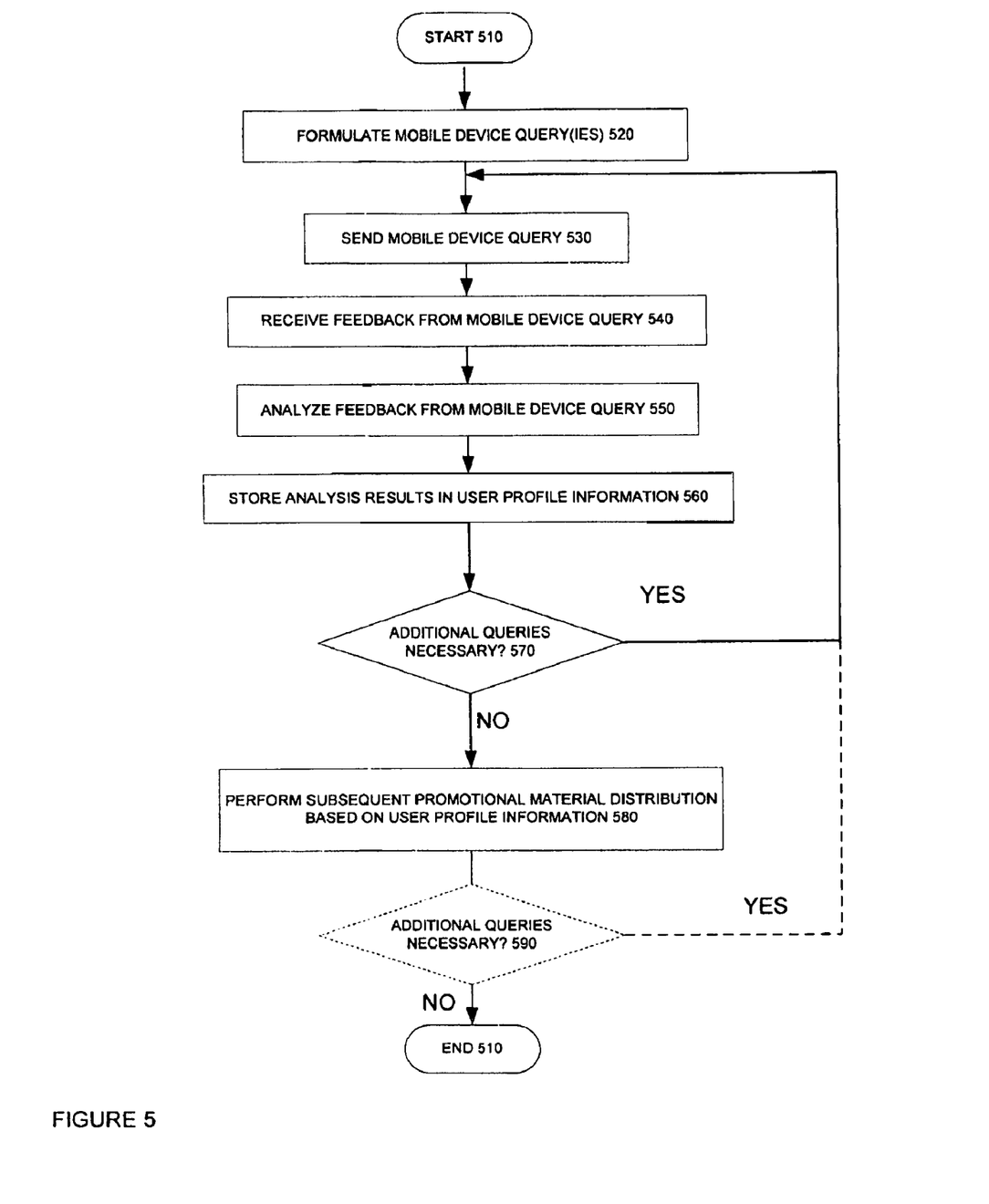
FIG. 5 illustrates a method performed in conjunction with or as part of managing a marketing or advertising campaign in accordance with at least one embodiment of the invention.

Turning to the operation of invention embodiments, it should be understood that queries may be sent for the purposes of determining mobile device capability, user ability and/or user inclination in responding to such queries. Moreover, it should be understood that the operations performed in connection with formulating and sending mobile queries and receiving and analyzing mobile query responses may be performed separately from each other or together and also may be performed prior to, as part of or separate and apart from the distribution of promotional material associated with one or more advertising campaigns. FIG. 5 illustrates operation of a methodology provided in connection with at least one invention embodiment, wherein mobile device queries are sent to a plurality of mobile device users via their mobile devices to elicit responses from the mobile device users that indicate mobile device capability, user ability and/or inclination.

In FIG. 5, operations begin at 510, and control proceeds to 520 wherein one or more mobile device queries is formulated to determine mobile device capability, user ability and/or user inclination in responding to such queries. This formulation may be performed by, for example, an advertising channel provider, as part of research to determine how mobile device users respond to particular formats of promotional material. Alternatively, this formulation may be performed with a particular advertiser, advertising campaign, or promotional material format in mind. As a result, the material used to formulate the mobile device query(ies) will depend on the ultimate goal of the particular query(ies) being formulated, e.g., determining whether mobile device users respond to MMS messages, determining whether mobile device users' device settings are optimized for a particular type of content to be sent by SMS, etc.

It should also be understood that mobile device queries may be sent as part of a new service subscription provisioning wherein a mobile device is queries to determine the capabilities of his/her mobile device, e.g., mobile phone. Based on the query results, the user's service may be confirmed associated benefits may be conferred to the user.

It should also be understood that one or mobile device queries may be sent in response to a particular event occurring after a mobile user's subscription to a service has been granted. For example, such queries may be sent to a mobile device user in response to a recognition that the user has a new phone or that the user has not responded to promotional material sent the user's mobile device for some specified period of time. In either of those examples, either the mobile device capability or the mobile device user ability may have changed since previous query responses were received. As a result, in any of these example scenarios, mobile device queries may provide user profile information, either initial information about a mobile device and/or user and update information about the mobile device and/or user.

Following formulation of the query(ies) at 520, control proceeds to 530, at which a mobile device query 530 is sent to one or more users. It should be understood that the scope of the invention is not limited to broadcast dissemination of identical queries to a plurality of users. Rather, one or more mobile device queries may be sent to a single user for the purposes of optimizing that user's mobile device settings to ensure that the mobile device effectively receives and outputs promotional material of a particular format.

Alternatively, the operations performed at 530 could include sending a broadcast query to a plurality of users to "poll" the mobile device users and determine device capability, user ability and/or user inclination.

Control then proceeds to 540, at which mobile device query responses are received from the mobile device users. This feedback may have many forms and includes a recordation of whether any response was received from the mobile device query. As indicated above, the absence of a response may be an indication that the mobile device lacks receipt or output capability, that the user lacks the ability to output or respond to the query or the user is disinclined to respond to the query. Thus, noting a non-response is valuable for the purposes of determining how and whether to query a non-responding mobile device further regarding which set of circumstances is correct. For example, if a user does not respond to a query sent via an MMS message, a follow up query may be sent via EMS, SMS or WAP Push. If no response is received, a text electronic mail message or pre-recorded audio message may be sent. In other words, by decreasing the technological capability of the queries each time a query is sent, the mobile device's capabilities or the user's presumed level of technical capability may be determined. Alternatively, if no response to the query is received, e.g., the user elects not to respond to the query, the user is incapable of responding the query, the query cannot be delivered successfully to the mobile device, a presumption may be made whether the user future queries are likely to be responded to. In such a circumstance, if there is a free or subsidized service agreement in place with the user, such non-responses may be grounds for terminating the service agreement or declining to grant a new service agreement.

Returning to the method of FIG. 5, following receipt of the feedback from the mobile device query, control proceeds to 550, at which the feedback responses are analyzed and, at 560, associated results are stored in a user's profile information. This user's profile information may or may not include or be implemented at a User Agent Profile. Regardless, the user profile information may be used to determine how to effectively transmit promotional material to the users of the mobile devices via their mobile devices.

Following analysis and storage of the query responses, a determination is made at 570 whether additional queries should be sent to one or more users.

This determination may be based on the operations performed at 520 and/or the query responses to the first mobile device query. For example, if the method operations are performed to determine the capabilities of mobile devices in general, a number of queries may be included to determine whether users' mobile devices have various types of capabilities. Alternatively, if the method operations are performed to perform optimization of mobile device settings, trouble shoot a problem with the receipt or output of promotional material on a mobile device or the like, the query response may be used to determine whether and which future mobile device queries should be sent. Thus, it should be understood that the complexity of the operation illustrated in FIG. 5 may be increased significantly depending on the performance context without departing from the scope of at least one invention embodiment.

For example, a query may be fairly simple, e.g., in order to find out what are the terminal capabilities and consumer capabilities a simple text message may be sent including a simple interaction query such as "Can you read this? Press reply to send message back." If the mobile device user is able to respond to this query the result may be stored in a database with a setting "Capability level 1 OK." If the mobile device user is not able to answer this query the "Capability level 1" will be marked with NOT OK. If the level 1 OK setting is stored in the user profile information, a next message with a more complicated or technically demanding query may be sent, e.g., a message with a picture and question in the picture "Can you see this? Press reply to send message back."

Assuming a positive response to the query, the user profile information may include "Capability level 2 OK." Further, the process could be continued by sending a next query with a video message with video requesting for certain feedback. Again assuming positive result the user profile information could be set to "Capability level 3 OK." This example has three mobile device queries composed in a hierarchical manner wherein the simplest query is sent first and then more demanding queries follow based on affirmative responses from the mobile device user.

However, it should be understood that the embodiments of the invention are not limited to this order. Queries need not be ordered based on any subject and may be unrelated. Further, there may be any number of queries and some queries may be formulated to take into account presentation capability levels of the mobile devices, e.g., more than point of inquiry may be included in a single query ("Can your read this? What color are the words?"). There are also multiple ways to respond to a query including replying to the query directly, writing a received code into a field at a web site, sending back a picture which is taken with the mobile device, calling a phone service, etc.

It should also be appreciated that a query may be included in or be implemented by an MMS message sent as a precursor to, included in or subsequent to a mobile device user subscribing to a new service. Therefore, it should be appreciated that feedback from the query, also referred to as a mobile device query response may be simply be confirmation from a communications network that the query was delivered successfully; thus a query response may require no actions on the part of the mobile device user.

In accordance with at least one embodiment of the invention, one or more mobile device queries may sent to mobile device users to determine the size of memory available in a mobile device. This is a particular challenge with regard to mobile devices that are mobile phones because the internal memory of such phones varies widely; thus, some mobile phones (even those that are MMS capable) may not be able to display MMS messages with sizes larger than, e.g., 30 kB). Thus, there is utility in being able to determine whether mobile devices fall into categories of maximum memory sizes, e.g., 30 kB, 100 kB, and 300 kB.

In accordance with at least one embodiment of the invention, one or more mobile device queries may sent to mobile device users to determine whether the mobile device is able to support click of embedded URL directly from a SMS/MMS message.

In accordance with at least one embodiment of the invention, one or more mobile device queries may sent to mobile device users to ensure that GPRS settings are correctly installed.

Returning to FIG. 5, if additional queries are necessary, control returns to 530 where at least one more additional mobile device query is sent and the method proceeds through operations 540-570 again. This repetitive performance of 530-570 may be performed until it is deemed that no additional queries are immediately necessary. Once, it is determined that no additional queries are necessary, control proceeds to 580, at which promotional material distribution is performed based, at least in part on the user profile information stored at 560. This distribution may also be performed based on instructions provided in connection with an advertising campaign associated with the promotional material.

Control may then proceed to 590 where a determination is made whether additional mobile device queries are necessary. Such a determination may be performed when the response rate to distributed promotional material indicates that the previously stored user profile information requires updating. For example, it is known that some mobile devices are initially configured by someone who is technically adept but are then used by users that are less so.

As a result, if initial queries were responded to by a user of a higher technical ability but subsequently the device is used by a user who is unable to operate the mobile device in the same manner, then initial queries must be resent to the user to determine how to effectively distribute promotional material to the actual user of the mobile device. Because this circumstance may not occur, it should be understood that the resending and analysis of a second set of queries and responses is optional. Control then proceeds to 500, at which the operations terminate.

Although not shown, it should be understood that the method of FIG. 5 may include an additional operation performed prior to 520, wherein service subscription request information is received and analyzed to determine initial user profile information for a mobile device user. Additionally, such user profile information may be formulated or augmented using other mechanisms including, for example, text-to-win campaigns, that require providing certain information in exchange for some actual or perceived item of value.

As explained in connection with FIG. 5, following analysis of one or more mobile device query responses and storage of results of that analysis for subsequent use, and the receipt of both profile attribute data and promotional material for a campaign, the advertisement management system (in connection with the VAS GW) may distribute promotional materials to individuals using the at least one communication network based on the mobile device query response analysis results. As explained in connection with the functionality and structure provided in accordance various invention embodiments (see FIGS. 1-3 and the associated textual description), such distribution may be performed using one or more of various formats of promotional material sent to mobile devices with a demonstrated capability to receive such promotional material and respond to the material.

As should be understood, mobile device users may then respond to such promotional materials directly via the at least one communication network and/or feedback can be indirect via one or more alternative systems (not shown), for example, through use of coupons, debits or tokens, by purchasing advertised products or services, etc.

Once mobile device users respond to the mobile device capability query, information indicating the type of response, the identity of the responder and other details regarding the response (timing, manner, associated mobile device user actions such as forwarding promotional material, etc.), that information may be collected by the feedback analysis system via, for example, the one or more communication networks and/or alternative systems (not shown) and stored along with the stored query response analysis data for the specific mobile device users. It should be understood, also, that the feedback analysis s system will also record an indication whether no response was received; this is because, receipt of no response may be considered to be indicative of the fact that: (1) the queried mobile device does not have the capability to receive and/or output the query, that mobile device's user lacks the ability to receive and/or output or respond to the query; or (3) that mobile device's user is not inclined to respond to queries similar to those sent (because of, for example, the format of the query, e.g., MMS, the timing of the query, during work hours, or a more generalized lack of interest in responding to such queries).

In this regard, it should understood that implementation of the methodologies and functionality provided by at least one of the embodiments of this invention may be used to monitor subscribers' compliance with terms and conditions for free or subsidized mobile device-related services (e.g., provided in connection with advertisement supported mobile services). Alternatively, it should be understood that a set of queries may be sent as part of a mobile device user subscribing to a free or subsidized mobile service. Accordingly, the service subscription may be partially or fully granted based on the mobile device user's responses to the one or more queries.

As should be understood by one of ordinary skill in the art from the description provided herein, analysis of the mobile device capability query responses can be used by advertisers and advertising firms to improve the efficacy of marketing or advertising campaigns.

Moreover, this marketing or advertising campaign efficacy information provided by embodiments of the invention can also or alternatively be used by advertising channel providers to improve mobile marketing or advertising campaign response rates by more efficiently and effectively using the advertising channel. Such an implementation may be of particular utility to advertising channel providers to increase profit because the invention would provide a mechanism for determining mobile marketing and advertising campaign efficacy. More specifically, an advertising channel provider's profits increase when a response rate increases. This is due to the fact that typically advertising is priced on a two-tiered approach: there is a basic price for sending promotional material to a mobile device and, if the targeted individual responds to the promotional material (e.g., by replying to the promotional material) the advertiser pays an additional fee to the advertising channel provider.

Accordingly, when an advertising channel provider uses the invention to provide a marketing or advertising campaign that includes promotional material in a format that is consistent with the capabilities of a mobile device and abilities of the mobile device user, the resulting advertising campaign is likely to be more successful at in eliciting responses from mobile device users.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention. For example, it should be understood that the term "promotional material" is meant to include any one of or combination of text, pictures, audio, video, links to web-sites or other locations of information, telephone numbers, electronic mail addresses, downloadable files including but not limited to audio files including ring tones, songs, etc, computer implemented games, video files, etc.

It should be understood that data used by the feedback analysis system may include information provided by a mobile device user in response to one or more mobile device capability requests. Alternatively, or in addition, that data may be information that is already available regarding one or more mobile device users as a result of them signing up for a service, e.g., an instant messaging service or mobile phone service; for example, in return for free services or reduced cost services. In turn, that information may be referenced by the feedback analysis system when analyzing response rates to promotional information and determining correlations with both specified and non-specified attributes.

It should be understood, also, that analysis of mobile device capability query responses may provide information indicating not only mobile device capability and user ability but also a most effective time or day to send particular formats of promotional material. For example, MMS promotional material content may not be responded to immediately if, for example, mobile device users are in school classes or at work. However, such query response feedback data may indicate such MMS promotional material is responded to at higher rates and more quickly at certain days of the week, e.g., weekends and holidays, or times of the day, e.g., during peak commuting times, after school classes have ended, etc. Thus, such information may be used by advertisers to tailor the delivery time of particular formats of promotional material for improved effect.

Further, it should be understood that the term "query" may include any form of transmitted data sent to a mobile device user at any time for the purpose of eliciting information from the mobile device user. For example, a query may be implemented as or be included in a message, e.g., a "Welcome Message" sent to a mobile device user, in preparation for, as part of, or subsequent to the mobile device user subscribing to a new service, e.g., a subsidized or free mobile device-related service.

Also, it should be understood that the term "promotional material" includes any type of content provided in connection with mobile marketing, mobile advertising or other material provided for the purpose of persuading mobile device users.

Further, it should be understood that in accordance with at least one embodiment of the invention, one or more of mobile device queries may be sent via different source than VAS GW.

Additionally, the mobile query response analysis may be used to determine which subset of mobile devices associated with a target audience lack the capability to receive content in a particular format. As a result, at least one embodiment of the invention provides the ability to send promotional material to a target audience in at least two types of formats, e.g., MMS and SMS or EMS. In such an implementation, the promotional material for may be sent via alternative paths or mechanism, e.g., including alternative equipment and networks, so that mobile devices receive the promotional material in a format that may be effectively output to the mobile device users.

Moreover, although various embodiment of the invention have been described herein that indicate that the transmission of mobile device queries are initiated only by advertisers or parties other than a mobile device user, it should be understood that, in accordance with at least one embodiment of the invention, at least one mobile device query may be transmitted to a mobile device user at the request of the mobile device user. Such an, on-demand implementation may have particular utility for a mobile device user when, for example, the user is considering purchasing a new mobile device and inserts the user's Subscriber Identity Module (SIM) card into a new device for the purpose of testing the device's capabilities in connection with a paid for, free or subsidized service to which the user has subscribed.

Further, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of advertisers, advertising channel provider(s), network providers, marketing organizations, etc.

Further, it should be understood that, in accordance with at least one embodiment of the invention, system components may be implemented together or separately and there may be one or more of any or all of the disclosed system components. For example, feedback analysis functionality and/or components may be provided by equipment and/or software operated by an advertisement operator and/or equipment and/or software operated and/or controlled by an advertiser. Further, one or more advertisers may use, control or communicate with feedback components to perform their own analyses.

System components may be either dedicated systems receiving feedback information and campaign related profiles and non related profiles form advertisement management system or such functionality may be implemented as virtual systems implemented on general purpose equipment via software implementations. Moreover, distribution of feedback information and profiles may be performed via an Application Program Interface (API) or any other methodology that is technologically and/or commercially advantageous.

Further the analysis of what was received and presented could be done using special application running in mobile device that could for example take a screen shot of the mobile phone screen and send it back to 50 for analysis and comparison of sent picture and received picture.

As a result, it will be apparent for those skilled in the art that the illustrative embodiments described are only examples and that various modifications can be made within the scope of the invention as defined in the appended claims.

The invention claimed is:

1. A method for granting a mobile device user with rights to one or more services using an associated mobile device, the method comprising:
    initiating, in a network element, transmission of a plurality of mobile device messaging queries to the associated mobile device, wherein the plurality of messaging queries is ordered so that an earlier transmitted messaging query is of a messaging format and/or has content different than the messaging format and/or content of a later transmitted messaging query;
    determining whether at least one messaging response to the plurality of messaging queries has been received from the mobile device user using the associated mobile device, said at least one messaging response including data generated based on information input to the mobile device by the mobile device user in response to the messaging query;
    analyzing the at least one messaging response to determine user profile information for the mobile device user and the associated mobile device;
    granting the mobile device user with rights to one or more services using the associated mobile device based on the analysis of the at least one messaging received from the mobile device associated with the mobile device user;
    wherein, if no mobile device query response is received the method further comprises:
    transmitting at least one additional messaging query to the at least one mobile device in a messaging format that is less advanced than previously transmitted messaging queries; and
    determining whether the mobile device user has responded to the any messaging query prior to granting the mobile device user with rights to one or more services;
    and wherein analysis of messaging responses for a plurality of mobile device users is performed to generate data providing an indication of which message formats are most effective for eliciting messaging responses.

2. The method of claim 1, wherein at least one of the plurality of messaging queries is a Multimedia Messaging Service welcome message.

3. The method of claim 1, further comprising receiving messaging responses to the plurality of messaging queries from a plurality of mobile device users each associated respectively with the plurality of mobile devices.

4. The method of claim 1, wherein the at least one messaging query is sent as a precursor to enable continued use of a service.

5. The method of claim 4, wherein, if no messaging query response is received, the method further comprises terminating the mobile device user's access to the service.

6. The method of claim 1, wherein at least one of the plurality of messaging queries is sent in response to a recognition that a mobile device user has changed mobile devices.

7. The method of claim 1, wherein at least one of the plurality of messaging queries is sent in response to a recognition that a mobile device user has changed subscription type.

8. The method of claim 1, wherein at least one of the plurality of messaging queries is sent in response to the mobile device user's in-activity in response to material distributed to the mobile device user as part of the one or more services.

9. The method of claim 1, wherein the material is promotional material distributed as part of an advertising campaign.

10. The method of claim 1, wherein analysis of the at least one messaging response determines whether the mobile device used by the mobile device user has one or more capabilities.

11. The method of claim 10, wherein the one or more capabilities includes any one of Short Messaging Service messaging, Multimedia Messaging Service messaging, WAP push messaging, Bluetooth messaging and Enhanced Messaging Service.

12. The method of claim 1, wherein the plurality of messaging queries are ordered so that earlier transmitted messaging queries are in formats that are less technically advanced than the messaging formats of later transmitted messaging queries.

13. The method of claim 1, further comprising transmitting a plurality of messaging queries, wherein the plurality of messaging queries are ordered so that earlier transmitted messaging queries are in messaging formats that are more technically advanced than the messaging formats of later transmitted messaging queries.

14. A computer readable storage media having computer executable instructions arranged to cause a computer, or a suite of computers to implement the method of claim 1.

15. A system for granting a mobile device user with rights to one or more services using an associated mobile device, the system comprising:

a mobile device query system in a network element, the mobile bile device query system being configured to initiate transmission of a plurality of mobile device messaging queries to the associated mobile device, wherein the plurality of messaging queries are ordered so that an earlier transmitted messaging query is of a messaging format and/or has content different than the messaging format and/or content of a later transmitted messaging query;

a feedback analysis system configured to determine whether at least one messaging response to the plurality of messaging queries has been received from the mobile device user using the associated mobile device, said messaging response including data generated based on information input to the mobile device user using the associated mobile device, wherein the feedback analysis system is further configured to determine user profile information for the mobile device user and the associated mobile device by analyzing the at least one messaging response; wherein the mobile device query system is configured to grant the mobile device user with rights to one or more services using the associate mobile device based on the analysis of the at least one messaging response received from the mobile device associated with the mobile device user;

wherein, if no messaging query response is received, the mobile device query system is configured to transmit at least on additional messaging query to the at least one mobile device in a messaging format that is less advanced than previously transmitted mobile device queries, and to determine whether the mobile device user has responded to the any messaging query prior to granting the mobile device user with rights to one or more services;

and wherein the feedback analysis system is further configured to generate data based on rates of messaging responses for a plurality of mobile device users, the data providing an indication of which message formats are most effective for eliciting messaging responses.

16. The system of claim 15, wherein at least one of the plurality of messaging queries is a Multimedia Messaging Service welcome message.

17. The system of claim 15, wherein the messaging query system is arranged to receive messaging responses to the plurality of messaging queries from a plurality of mobile device users each associated respectively with the plurality of mobile devices.

18. The system of claim 15, wherein at least one of the plurality of messaging queries is sent as a precursor to enable continued use of a service.

19. The system of claim 18, wherein, if no messaging query response is received, the system is further arranged to terminate the mobile device user's access to the service.

20. The system of claim 15, wherein at least one of the plurality of messaging queries is sent in response to a recognition that a mobile device user has changed mobile devices.

21. The system of claim 15, wherein at least one of the plurality of messaging queries is sent in response to a recognition that a mobile device user has changed subscription type.

22. The system of claim 15, wherein at least one of the plurality of messaging queries is sent in response to the mobile device user's in-activity in response to material distributed to the mobile device user as pan of the one or more services.

23. The system of claim 15, wherein analysis of the at least one messaging response determines whether the mobile device used by the mobile device user has one or more capabilities.

24. The system of claim 23, wherein the one or more capabilities includes any one of Short Messaging Service messaging, Multimedia Messaging Service messaging, WAP push messaging, Bluetooth messaging and Enhanced Messaging Service.

25. The system of claim 15, wherein the plurality of messaging queries are ordered so that earlier transmitted queries are in messaging formats that are less technically advanced than the messaging format of later transmitted messaging queries.

26. The system of claim 15, wherein the plurality of messaging queries are ordered so that earlier transmitted queries are in messaging formats that are more technically advanced than the messaging format of later transmitted messaging queries.

* * * * *